(12) United States Patent  (10) Patent No.: US 7,587,974 B2
Cohen et al.  (45) Date of Patent: Sep. 15, 2009

(54) FOOD PROCESSOR APPLIANCES

(75) Inventors: Eli Cohen, Lev HaSharon (IL); Ann Grant, New York, NY (US)

(73) Assignee: AAC Trade Ltd., New York, NY (US)

( * ) Notice: Subject to any disclaimer, the term of this patent is extended or adjusted under 35 U.S.C. 154(b) by 474 days.

(21) Appl. No.: 11/329,054

(22) Filed: Jan. 11, 2006

(65) Prior Publication Data

US 2006/0130676 A1  Jun. 22, 2006

Related U.S. Application Data

(63) Continuation-in-part of application No. PCT/IL2005/000760, filed on Jul. 17, 2005, which is a continuation-in-part of application No. 10/972,424, filed on Oct. 26, 2004, now Pat. No. 7,040,220.

(51) Int. Cl.
*B26D 1/00* (2006.01)
*A23L 2/04* (2006.01)

(52) U.S. Cl. ............................. 99/509; 99/492; 99/495; 99/510; 99/511; 99/512; 99/513; 426/61; 426/63; 426/49; 426/52; 426/533; 426/599; 426/231; 426/232; 426/233

(58) Field of Classification Search .................. 99/492, 99/495, 509–513; 426/61, 63, 49, 52, 533, 426/599, 231–3
See application file for complete search history.

(56) References Cited

U.S. PATENT DOCUMENTS

| | | | |
|---|---|---|---|
| 1,954,154 A | * | 4/1934 | Urquhart ..................... 169/15 |
| 4,297,038 A | | 10/1981 | Falkenbach |
| 4,350,087 A | | 9/1982 | Ramirez |
| 4,506,601 A | | 3/1985 | Ramirez et al. |
| 4,614,153 A | | 9/1986 | Kurome et al. |
| 4,681,031 A | | 7/1987 | Austad |
| 4,700,621 A | | 10/1987 | Elger |
| 4,744,522 A | * | 5/1988 | Borgmann et al. ............ 241/92 |
| 5,784,954 A | | 7/1998 | Kokot et al. |
| 5,819,641 A | * | 10/1998 | Hsu ........................... 241/92 |
| 6,202,547 B1 | | 3/2001 | Tseng et al. |
| 6,397,736 B1 | | 6/2002 | Tseng et al. |
| 6,412,404 B1 | | 7/2002 | Hsu |
| 6,742,447 B1 | | 6/2004 | Chen |
| 6,813,997 B1 | | 11/2004 | Lin |
| 6,862,982 B1 | | 8/2005 | Wang |
| 7,040,220 B1 | | 5/2006 | Cohen et al. |
| 2006/0086261 A1 | | 4/2006 | Cohen et al. |

FOREIGN PATENT DOCUMENTS

| | | |
|---|---|---|
| DE | 958052 | 2/1957 |
| DE | 29704595 | 5/1997 |
| DE | 102004015884 | 11/2005 |
| EP | 1080679 | 3/2001 |
| WO | WO 2006/046226 | 5/2006 |

* cited by examiner

*Primary Examiner*—Shawntina Fuqua

(57) ABSTRACT

A food processor appliance includes various types of adaptors for permitting both liquid and solid food ingredients to be separately or concurrently fed into the appliance for processing therein, or for adapting the appliance particularly for processing long, slim food articles, such as carrots, cucumbers, etc. Another described feature is particularly useful for juicer-type appliances, and includes a base for supporting a juice-receiver receptacle, which base includes a retractable tray for catching drippings when the receptacle is not in place.

33 Claims, 7 Drawing Sheets

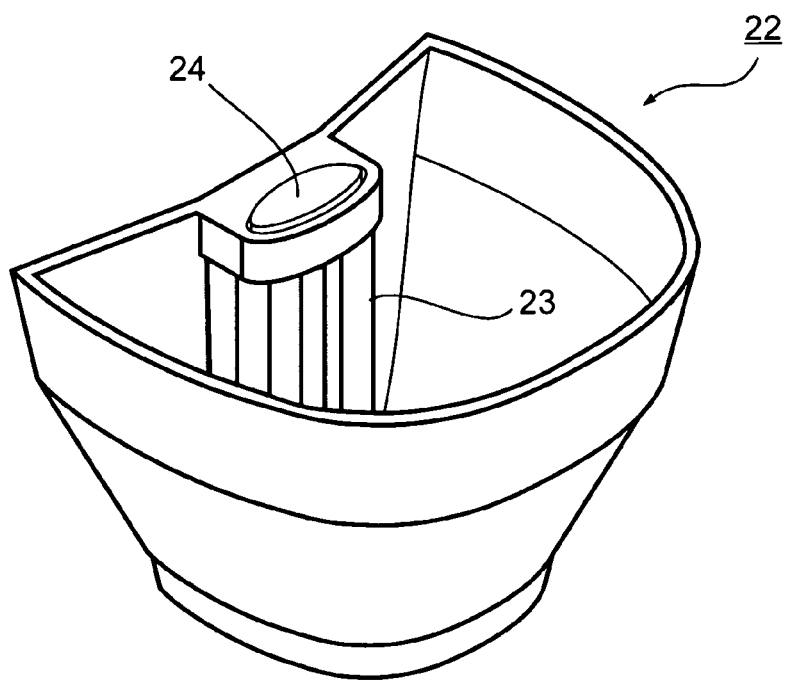
Fig. 2
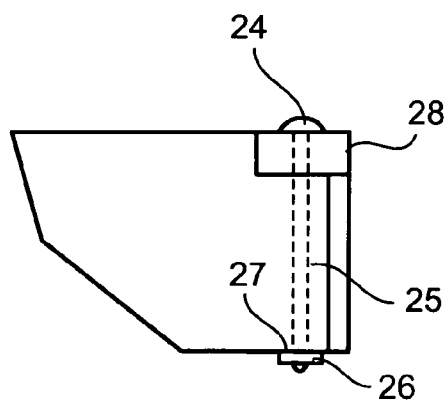 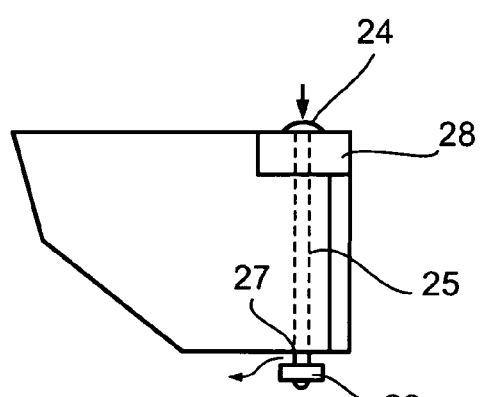
Fig. 3a   Fig. 3b

FOOD PROCESSOR APPLIANCES

RELATED APPLICATIONS

The present application is a continuation-in-part of PCT Patent Application No. PCT/IL2005/000760, filed on Jul. 17, 2005, which is a continuation-in-part of pending U.S. patent application Ser. No. 10/972,424, filed on Oct. 26, 2004, the contents of which are incorporated herein by reference.

FIELD AND BACKGROUND OF THE INVENTION

The present invention relates to food processor appliances, such as the juice-extractor and bean-grinder appliances described in the above-cited International Patent Application, and provides a number of improvements particularly useful in such appliances, as will be described more particularly below.

According to one aspect of the present invention, there is provided a food processor appliance, comprising: a housing including a food processing device therein; a feed tube having an inlet end projecting from an upper surface of the housing for inputting into the housing food articles to be processed by the food processing device; a funnel configured to be received in the inlet end of the food processor feed tube for feeding the food articles via the feed tube to the food processing device within the housing; and a liquid-receiver receptacle configured to occupy only a portion of the funnel such as to permit both liquid and solid food ingredients to be separately or concurrently fed via the feed tube to the food processing device within the housing.

According to another aspect of the present invention, there is provided an adaptor for a food processor appliance having a feed tube a funnel receivable within the inlet end of the food tube; and a liquid-receiver receptacle configured to occupy only a portion of the funnel such as to permit both liquid and solid food ingredients to be separately or concurrently fed via the feed tube into the food processor appliance.

According to further features in described embodiments, the liquid-receiver receptacle includes a manually-controllable valve for selectively feeding the liquid therein to the feed tube. The valve includes a push-button carried at one end of a stem, and a valve member carried at the opposite end of the stem and movable thereby to a closed or open position with respect to a valve opening formed in the bottom of said liquid-receiver receptacle. The liquid-receiver receptacle is removably received within the funnel and includes a conical section at one side complementary to the portion of the funnel occupied by the liquid-receiver receptacle, and a handle section at the opposite side for applying and removing the liquid-receiver receptacle with respect to the funnel. The handle section is integrally formed in a wall extending across the opposite side of the liquid-receiver receptacle and carries the operator of the manually-controllable valve.

In another described embodiment, the adaptor includes a gate between the funnel and the feed tube manually movable to an open or a closed position to selectively control the flow of the contents of the funnel to the food processor device within the housing. The gate is pivotally mounted to a closed position between the funnel and the feed tube, or to an open position away from the funnel and the feed tube.

In another described embodiment, the funnel includes a partition member presettable to selectively divide the funnel into a liquid-receiver portion and a solid-receiver portion. The partition member is pivotally mounted at its upper end to selectively move its lower end with respect to one or more outlet openings at the lower end of the funnel.

According to another aspect, the invention provides a base for supporting a food processor appliance comprising a housing including a juice extractor, an outlet for outletting extracted juice, and a juice-receiver receptacle for receiving the extracted juice; characterized in that the base includes a tray to underlie the juice outlet for supporting the juice-receiver receptacle and for receiving any drippings from the juice outlet when the juice-receiver receptacle is not supported thereon. The tray is movable from a non-operative, retracted position within the base, to an operative, extended position projecting from the housing under the juice outlet.

According to yet another aspect of the present invention, there is provided a food processor appliance comprising a housing including a food processing device therein; and a feed tube having an inlet end for inputting into the housing food articles to be processed by the food processing device; characterized in that the feed tube includes a plurality of radially-displaceable fingers engageable with food articles fed therethrough, for restricting lateral movement of such food articles within the feed tube during the operation of the food processing device. In one described preferred embodiment, the plurality of radially-displaceable fingers are leaf springs attached to the inner surface of the feed tube.

According to yet another aspect of the present invention, there is provided a food processor appliance comprising a housing including a food processing device therein; and a feed tube having an inlet end for inputting into the housing food articles to be processed by the food processing device; characterized in that the appliance further comprises an adaptor receivable in the feed tube and having a passageway of smaller cross-section than that of the feed tube for adapting the appliance to receive long, slim food articles, such as carrots, cucumbers and the like, in a manner restricting lateral movement thereof within the feed tube during the operation of the food processing device.

Further features of the invention will be apparent from the description below.

BRIEF DESCRIPTION OF THE DRAWINGS

The invention is herein described, by way of example only, with reference to the accompanying drawings, wherein:

FIG. 2 illustrates the liquid-receiver receptacle in the adaptor of FIG. 1 showing in full lines the open position of the liquid-valve thereof, and in broken lines the closed position thereof;

FIGS. 3a and 3b are a bottom views of the liquid-receiver receptacle in the adaptor of FIG. 1 showing the valve-closed and valve-opened positions, respectively, of the manually-controllable valve thereof;

FIG. 11 illustrates an adaptor receivable within the feed tube of the appliance of FIG. 1, adapting the appliance for processing long, slim food articles, such as carrots, cucumbers and the like; and FIG. 12 illustrates a modification in the construction of the adaptor of FIG. 11.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

Figure 1:
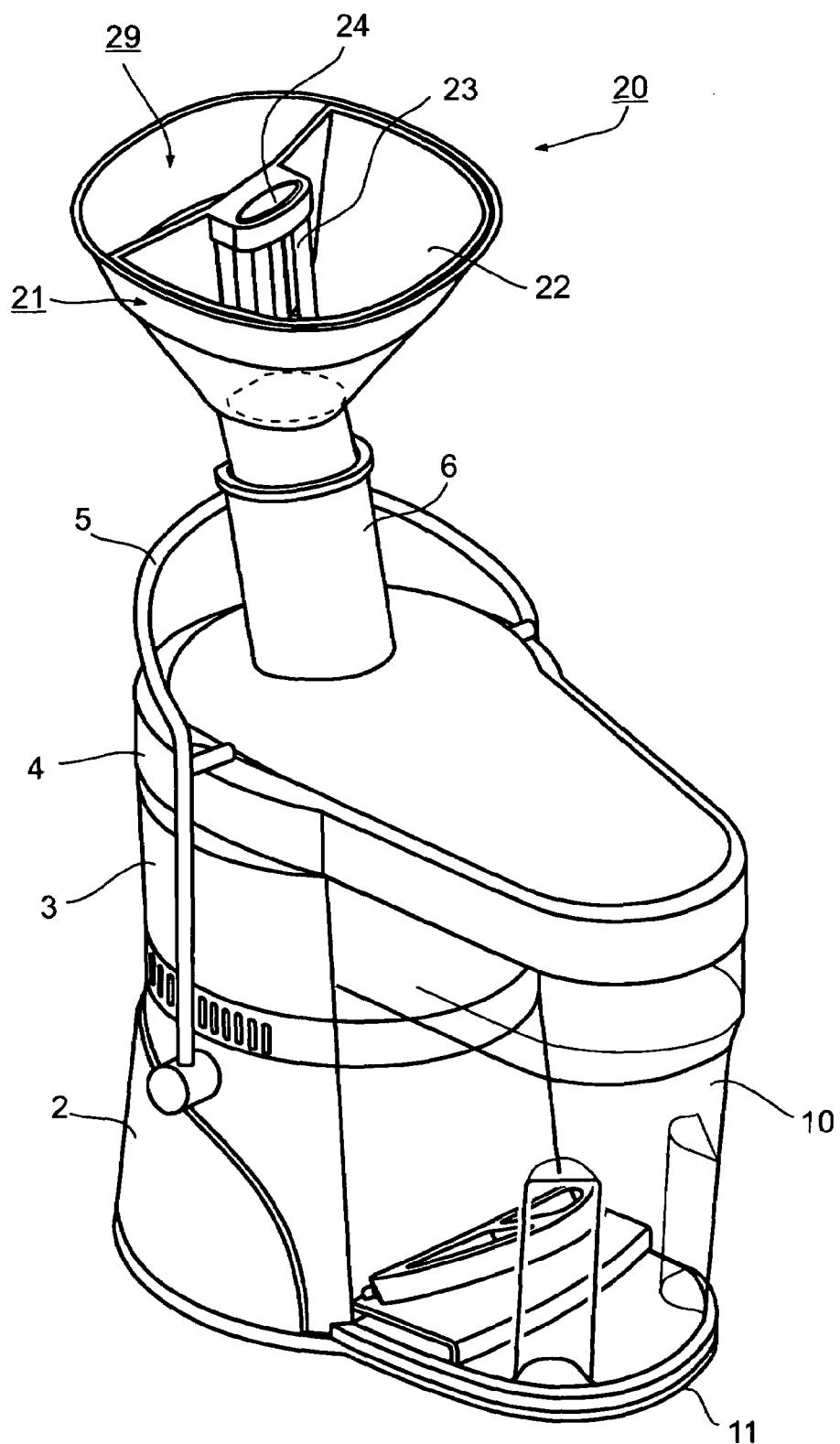
FIG. 1 is a three-dimensional view from one side illustrating a food processor appliance including an adaptor constructed in accordance with one of the improvements in the present application.
Figure 8:
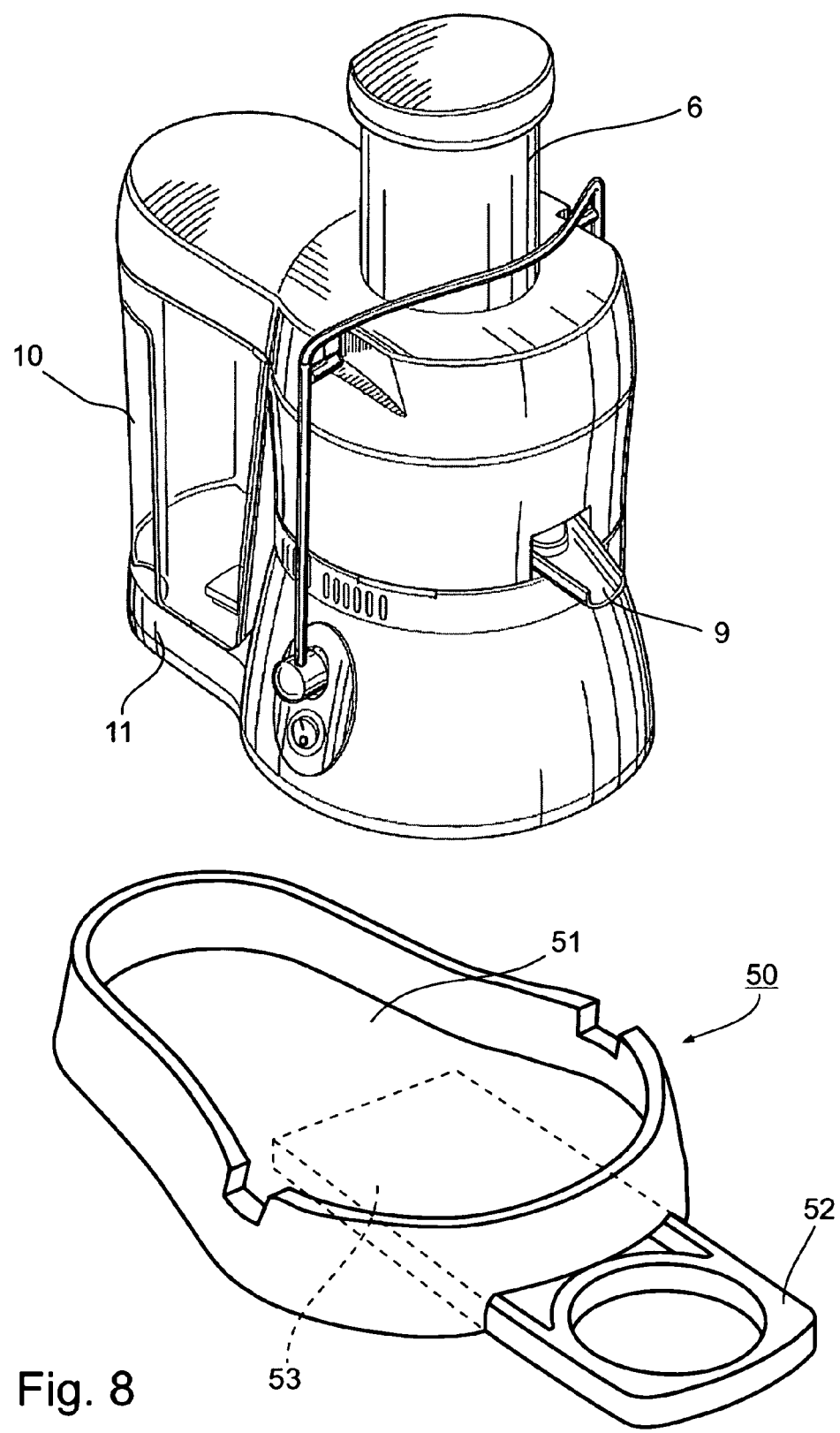
FIG. 8 is an exploded view illustrating a base constructed in accordance with the present invention for use with the food processor appliance of FIG. 1.
Figure 9:
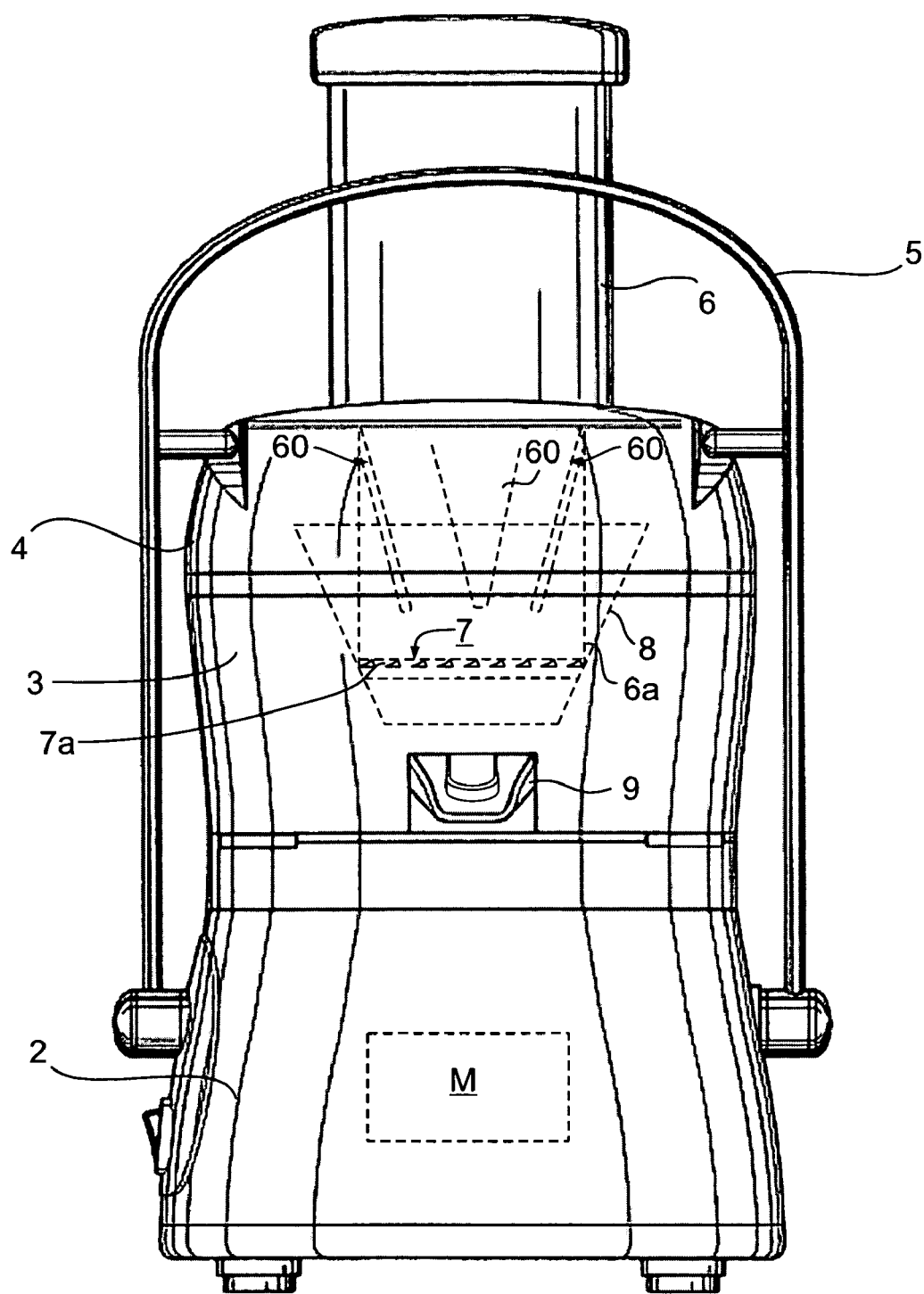
FIG. 9 is a front view illustrating the appliance of FIG. 1 but incorporating another improvement in accordance with the present invention.

For purposes of example, the various improvements involved in the present invention are shown in the drawings as being embodied in a food processor appliance constructed as described in the above-cited International Patent Application PCT/IL05/000760. Such an appliance includes a housing constituted of a lower base 2, an upper base 3, and a top cover 4. A locking bar 5 is pivotally mounted to the lower base 2 and is engageable with the top cover 4 for selectively locking the cover in place, as shown in FIGS. 1, 8 and 9, or unlocking the cover to enable access into the interior of the housing. Cover 4 is integrally formed with an inlet feed tube 6 integrally formed with the upper surface of the cover for inputting food articles to be processed by the appliance.

The illustrated appliance is used particularly as a power juicer for extracting juice from the food articles inputted via the feed tube 6. As described in the above-cited International Patent Application, such a power juicer includes a motor (M, FIG. 9) driving a cutter disc 7 (FIGS. 9 and 10) which, when rotated, cuts the inputted food articles into a pulp saturated with the juice to be extracted. The cutter disc 7 is enclosed by a strainer basket 8 which, upon rotation of the cutter disc and strainer basket, separates the liquid juice from the pulp. The liquid juice is outletted via a juice outlet 9 on one side of the housing, whereas the residual pulp is ejected into a food-receiver receptacle 10 supported on a ledge 11 on the opposite side of the housing.

The appliance described in the above-cited International Patent Application may also be used as a grinder for grinding coffee beans, soya beans, or the like. For this purpose, the outer periphery 7a (FIG. 9) of cutter disc 7 is constructed with a grinding surface cooperable with a grinding surface 6a on feed tube 6 for grinding the beans inputted via the feed tube 6 and for ejecting the ground product into receptacle 10.

The improvements of the present invention do not involve the structure for extracting the juice from the inputted food articles, or for grinding beans inputted into the appliance, and therefore such structures are shown only schematically in the drawings. Details of such structures, however, are available from the above-cited International Patent Application, the contents of which are incorporated herein by reference.

FIGS. 1-3a illustrate one improvement in such an appliance in accordance with the present invention. According to this improvement, the illustrated appliance further includes an adaptor, generally designated 20, for adapting the appliance to receive both liquid and solid food ingredients which may be separately or concurrently fed via the feed tube 6 to the processing device within housing 3 of the appliance. For example, it may be desirable to feed soya beans or other hard food ingredients into the appliance concurrently with water or another liquid in order to produce a pasty mixture. Adaptor 20 illustrated in FIGS. 1-3 could be used for such a purpose.

As shown in FIG. 1, adaptor 20 includes a funnel 21 receivable in the inlet end of the feed tube 6, and a liquid-receiver receptacle 22 removably received within funnel 21. Liquid-receiver receptacle 22 is configured to occupy only a portion of the volume of funnel 21, such as to permit both liquids (via receptacle 22) and solids (via the funnel not occupied by receptacle 22) to be separately or concurrently fed into feed tube 6 for processing by the food processing device within the appliance. Liquid-receiver receptacle 22 is provided with a handle 23 to facilitate its manipulation.

Liquid-receiver receptacle 22 further includes a manually-controllable valve for selectively feeding the liquid therein to feed tube 6. As shown in FIG. 1, the latter valve is a push-button 24 which is carried at one end of a stem 25 (FIGS. 3a, 3b), and a valve member 26 carried at the opposite end of the stem and movable thereby to a closed position (FIG. 3a) or open position (FIG. 3b) position with respect to a valve opening 27 at the bottom of receptacle 22. Handle 23 may further include an actuator mechanism, shown schematically at 28 in FIGS. 3a and 3b, such that depression of push-button 24 moves valve member 26 to its valve-closed position (FIG. 3a), whereas the subsequent depression of the push-button move the valve member to its valve-open position (FIG. 3b). Any known push-button actuator mechanisms may be used for this purpose.

The manner of using the adaptor 20 illustrated in FIGS. 1-3 will be apparent from the above description. Thus, if a liquid ingredient, such as water, is to be fed into the appliance together with a solid food ingredient, such as for producing a pasty mixture from soya beans and water, the liquid is introduced into receptacle 22 when push-button 24 is in the valve-closed condition. The solid food ingredients are then introduced into the space 29 not occupied by receptacle 22. Push-button 24 may then be depressed to move valve member 26 to its open position (FIG. 3b), thereby releasing the liquid within the receptacle to flow through feed tube 6 together with the solid food ingredients introduced via space 29 of the funnel 21. Thus, both ingredients are introduced via feed tube 6 into the appliance for processing therein.

Figure 4:
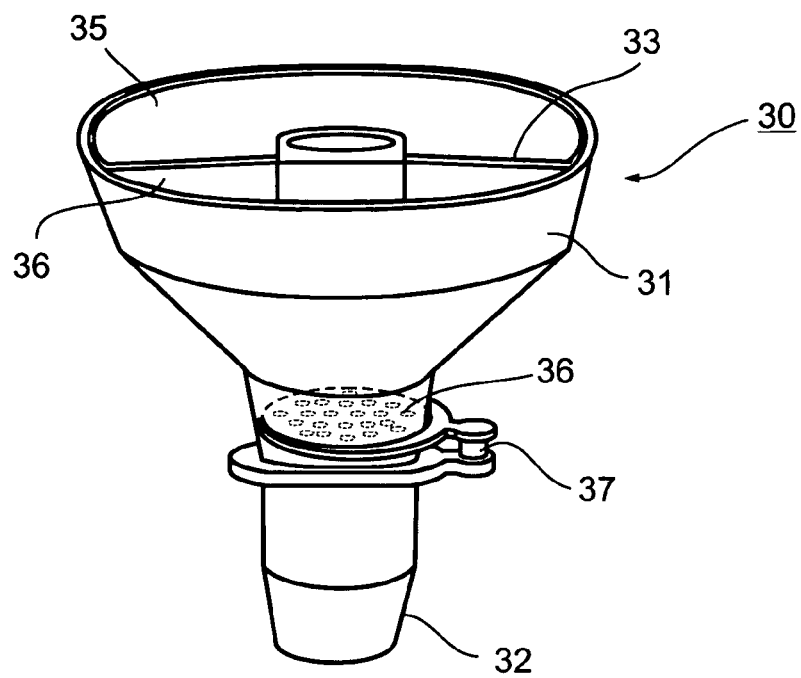
FIG. 4 is illustrates another adaptor constructed in accordance with the present invention for use the food processor appliance, showing a gate thereof in its closed position.
Figure 5:
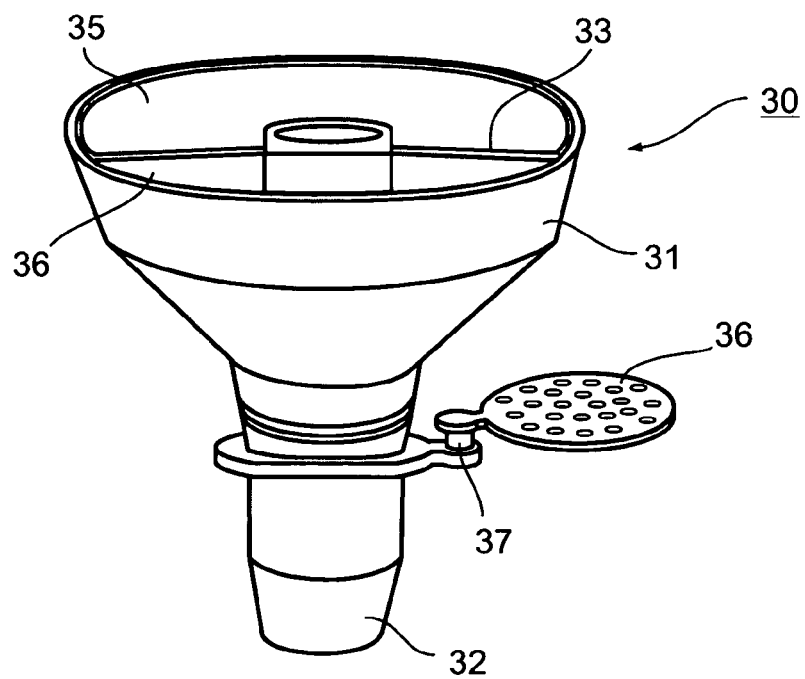
FIG. 5 illustrates the adaptor of FIG. 4 with the gate in its open position.

FIGS. 4 and 5 illustrate another adaptor, therein generally designated 30, that may be used for this purpose. Adaptor 30 includes a funnel 31 having an outlet end 32 receivable within the inlet end of feed tube 6. The upper end of funnel 31 includes a partition 33 dividing its interior into a liquid-receivable section 34 and a solid-receivable section 35 both communicating with the funnel outlet 32.

Adaptor 30 further includes a gate 36 between the funnel 31 and its outlet end 32 receivable within feed tube 6 of the appliance to selectively control the flow of the food ingredients from the two sections 34, 35 into the appliance feed tube. Gate 36 is pivotally mounted at 37 so as to be movable from a closed position, illustrated in FIG. 4, blocking the flow of the solid food ingredients to feed tube 6, or to an open position, shown in FIG. 5, permitting the flow of such food ingredients into the feed tube.

Thus, the solid food ingredients may be introduced into its section 35 of funnel 31 while the gate 36 is in its closed position (FIG. 4) to temporarily block the flow via the funnel into feed tube 6. The liquid ingredients may then be added at a desired controlled rate into the liquid section 34 of funnel 31, and then gate 36 may be flipped to its open position (FIG. 5), so that the liquid, together with the solid ingredients, flow together into the feed tube 6 for processing by the food processor.

Figure 6:
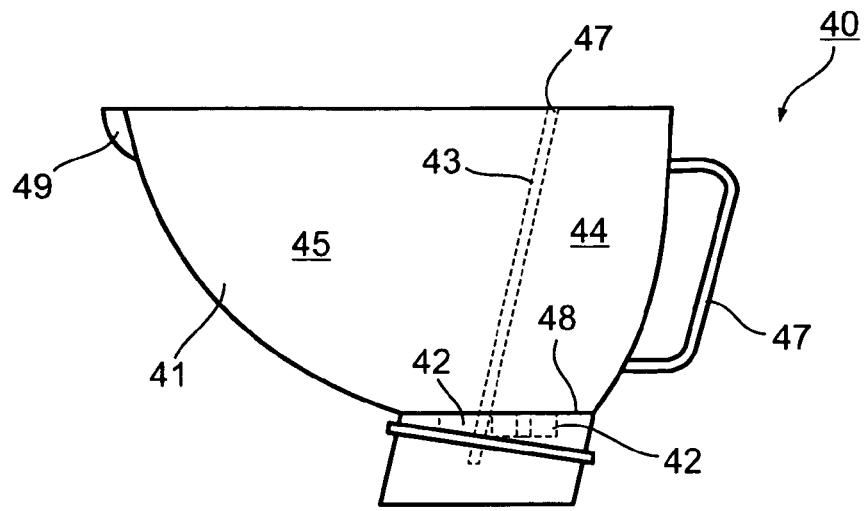
FIGS. 6 and 7 are side and plan views, respectively, illustrating another adaptor for use with the food processor appliance of FIG. 1.
Figure 7:
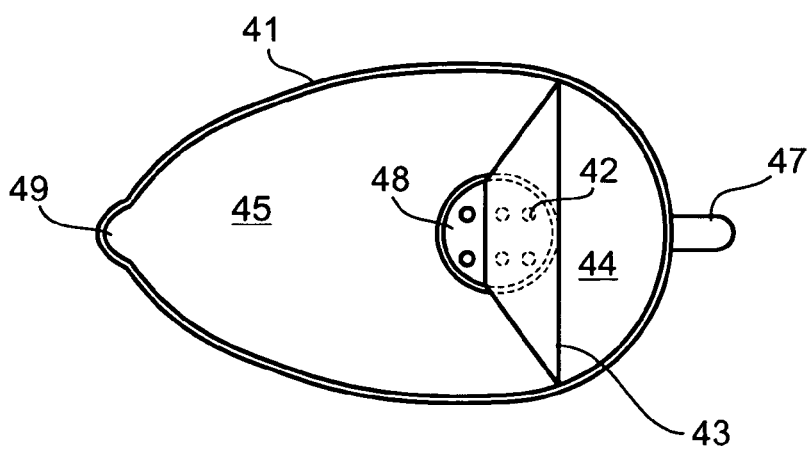

FIGS. 6 and 7 illustrate another adaptor, therein generally designated 40, which may be used for concurrently feeding both liquid and solid ingredients into the food processor appliance. Adaptor 40 illustrated in FIGS. 6 and 7 includes a funnel section 41 having an enlarged outlet opening 42 at its bottom, and a partition member 43 presettable to selectively divide the funnel into a liquid-receiver portion 44, and a solid-receiver portion 45. Funnel 41 further includes an outlet tube 46 communicating with the outlet opening 42 enabling the adaptor to be removably received in the open end of the feed tube 6 (FIG. 1).

Partition member 43 is a plate pivotally mounted at its upper end 47 to selectively move its lower end with respect to one or more outlet openings 42 at the lower end of the funnel, and thereby to enable both solid and liquid food ingredients to be fed, concurrently or separately, into feed tube 6 of the food processor appliance. Outlet openings 42 are preferably in the form of small nozzles projecting downwardly from a bottom wall 48 to define a plurality of passageways 48*a* which can be selectively covered by the lower end of partition 43, to thereby control the rate of introduction of the liquid from funnel section 44 into the feed tube.

Adaptor 40 illustrated in FIGS. 6 and 7 is preferably also provided with a handle 47 at one end to facilitate its manipulation, and with a spout 48 at the opposite end to facilitate pouring out its contents if desired.

Another improvement in the illustrated appliance relates to the juice extractor within the appliance. As shown in FIG. 8, a base 50 is provided to support the appliance and also a receptacle (e.g., glass or cup) to underlie the juice outlet 9 for the juice produced within the appliance. Base 50 is includes a main section 51 for receiving the appliance, and a tray 52 to underlie the juice outlet 9 for supporting the juice-receiver receptacle. Tray 52 also receives any drippings from the juice outlet 9 when a juice-receiver receptacle is not supported thereon, thereby maintaining the supporting surface, such as a table, for the appliance clean of such drippings. Tray 52 is movable within a recess or compartment 53 formed in base 2, from its operative extended position, as illustrated in FIG. 3, wherein it projects from the base under the juice outlet 9, to a non-operative retracted position (shown in broken lines) when the juice extractor is not used.

Figure 10:
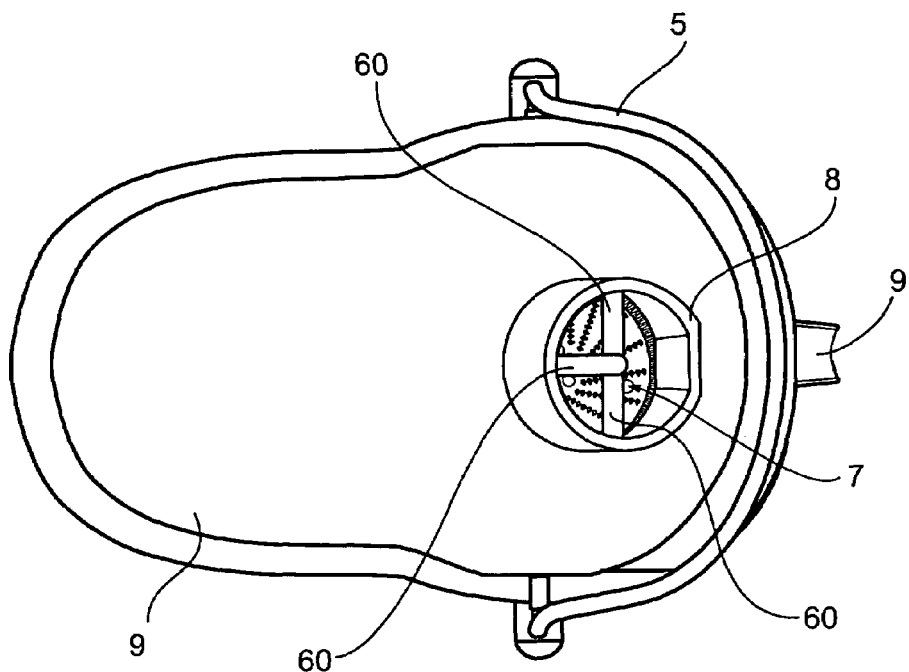
FIG. 10 is a top plan view of the appliance of FIG. 9.

FIGS. 9 and 10 illustrate another improvement included in the above-described appliance. One of the advantages in this appliance, as described more particularly in the above-cited International Patent Application, is that the feed tube 6 is of relatively large diameter so that it can accommodate relatively large food articles, such as whole apples, oranges, and the like. However, when the food articles to be introduced are relatively long and slim, such as carrots, cucumbers and the like, their engagement with the rotating cutter disc 7 (FIGS. 9 and 10) produces large lateral movements of the engaged food articles. Such lateral movements not only affect the efficiency and quality of the cutting operation produced by the cutting disc, but also produce distracting noise. FIGS. 9 and 10 illustrate an improvement which reduces lateral movement of such food articles, and thereby enhance the efficiency and quality of the cutting operation as well as producing a more silent operation of the appliance.

Thus, as shown in FIGS. 9 and 10, the feed tube 6 for feeding the food articles is integrally formed with a plurality of radially-displaceable fingers 60 engageable with food articles fed through the feed tube for restricting lateral movement of such food articles within the feed tube during the operation of the appliance. Fingers 60 are preferably leaf springs carried by the lower end of the feed tube 6. The upper end of each such leaf spring is joined to the feed tube, whereas the lower end is bent inwardly into the passageway within the feed tube, but is displaceable outwardly from its point of attachment to the feed tube.

It will thus be seen that fingers 60 carried by the lower end of feed tube 6 are continuously engageable with the food articles fed through the feed tube irrespective of their size, to restrict lateral movement of such food articles during the rotation of the cutter disc 7. Thus, if the food articles fed into the feed tube are long and slim, e.g., carrots or cucumbers, such food articles will normally be engaged by the lower ends of the fingers 60; and when the food articles fed into the feed tube are of larger diameter, fingers 60 will deflect radially outwardly to thereby define a larger passageway for such food articles.

Figures 11, 12:
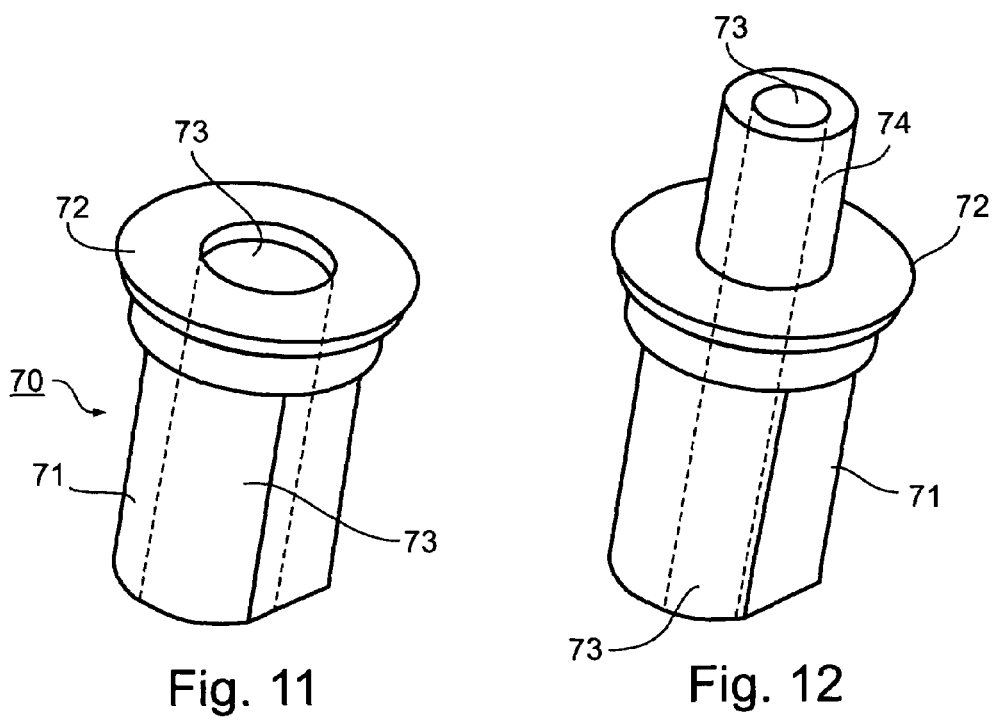

FIG. 11 illustrates another improvement, also useful for accommodating long, slim food articles such as carrots and cucumbers, in a manner to restrict lateral movement of the food articles during the operation of the appliance. In this case, the improvement is in the form an adaptor, generally designated 70, receivable in the upper end of the feed tube 6. Adaptor 70 includes a lower section 71 having an outer diameter substantially the same as the inner diameter of the feed tube 6 so as to be received within the feed tube, and an upper section 72 of larger outer diameter than the inner diameter of feed tube 6 for seating on the upper end of the feed tube. Adaptor 70 is further formed with the passageway 73 through both sections 71, 72. Passageway 73 is of smaller diameter than the inner diameter of the feed tube, and thereby is adapted to receive long, slim food articles in a manner restricting lateral movement of such articles within the feed tube during the operation of the appliance.

FIG. 12 illustrates an adaptor of the same construction as described above with respect to FIG. 11, but in this case, the upper section 72 of the adaptor includes an outer tubular extension 74. Preferably, the outer diameter of extension 74 is the same as, or slightly smaller than, the outer diameter of lower section 71.

It will be appreciated that the adaptor illustrated in FIG. 11 or in FIG. 12 is receivable within the upper end of feed tube 6 of the appliance, so as to be usable when long slim food articles are fed into the appliance, but is removable when necessary to enable the feed tube also to accommodate larger food articles.

It will be appreciated that the various improvements described above may be used individually with or without others of these improvement, and that such improvements may be used with other types of food processing appliances in addition to those illustrated herein. It will be further appreciated that these improvements have been described with respect to preferred embodiments thereof, and that many other variations, modifications and applications of these improvements may be made.

What is claimed is:

1. A food processor appliance, comprising:

a housing including a food processing device therein;

a feed tube having an inlet end projecting from an upper surface of said housing for inputting into said housing food articles to be processed by the food processing device;

a funnel configured to be received in said inlet end of the food processor feed tube for feeding the food articles via said feed tube to said food processing device within the housing;

and a liquid-receiver receptacle within said funnel configured to occupy only a portion of said funnel such as to permit both liquid and solid food ingredients to be separately or concurrently fed via said feed tube to said food processing device within the housing.

2. The appliance according to claim 1, wherein said liquid-receiver receptacle includes a manually-controllable device for selectively feeding the liquid therein to said feed tube.

3. The appliance according to claim 2, wherein said manually-controllable device is a valve which includes a push-button carried at one end of a stem, and a valve member carried at the opposite end of the stem and movable thereby to a closed or open position with respect to a valve opening formed in the bottom of said liquid-receiver receptacle.

4. The appliance according to claim 3, wherein said liquid-receiver receptacle is removably received within said funnel and includes a conical section at one side complementary to the portion of the funnel occupied by said liquid-receiver receptacle, and a handle section at the opposite side for applying and removing said liquid-receiver receptacle with respect to said funnel.

5. The appliance according to claim 4, wherein said handle section is integrally formed in a wall extending across said opposite side of the liquid-receiver receptacle and carries the said push-button of the manually-controllable valve.

6. The appliance according to claim 1, wherein said funnel and said liquid-receiver receptacle are included in an adaptor removably supportable by said feed tube.

7. The appliance according to claim 2, wherein said manually-controllable device includes a gate manually movable to an open or a closed position to selectively control the flow of the contents of the funnel to the food processor device within the housing.

8. The appliance according to claim 7, wherein said gate is pivotally mounted to a closed position between said funnel and said feed tube, or to an open position away from said funnel and said feed tube.

9. The appliance according to claim 1, wherein said funnel includes a partition member presettable to selectively divide the funnel into a liquid-receiver portion and a solid-receiver portion.

10. The appliance according to claim 9, wherein said partition member is pivotally mounted at its upper end to selectively move its lower end with respect to one or more outlet openings at the lower end of the funnel.

11. The appliance according to claim 1, wherein said food processing device within the housing includes a juice extractor, a juice outlet for outletting the extracted juice, and a tray underlying said juice outlet for supporting a juice-receiver receptacle to receive the juice outletted from said juice outlet, as well as any drippings from said juice outlet when a juice receptacle is not supported thereon.

12. The appliance according to claim 11, wherein said tray is carried by a base for receiving said housing and is movable from a non-operative, retracted position within said base, to an operative, extended position projecting from said base under said juice outlet.

13. The appliance according to claim 1, wherein said feed tube includes a plurality of radially-displaceable fingers engageable with food articles fed therethrough for restricting lateral movement of such food article within the feed tube during the operation of the fluid processing device.

14. The appliance according to claim 13, wherein said plurality of radially-displaceable fingers are leaf springs attached to the inner surface of said feed tube.

15. The appliance according to claim 1, wherein said appliance further comprises an adaptor receivable in said feed tube and having a passageway of smaller cross-section than that of said feed tube for adapting the appliance to receive long, slim food articles, such as carrots, cucumbers and the like, in a manner restricting lateral movement thereof within said feed tube during the operation of said food processing device.

16. The appliance according to claim 15, wherein said adaptor includes:

a lower section having an outer diameter substantially the same as the inner diameter of the feed tube for reception therein;

an upper section of larger outer diameter than the inner diameter of the feed tube for seating on the inlet end of the feed tube;

and a passageway of smaller diameter than the inner diameter of the feed tube for receiving long, slim food articles in a manner restricting lateral movements thereof within said feed tube during the operation of said food processing device.

17. The appliance according to claim 16, wherein said upper section of the adaptor includes an outer tubular extension of the same outer diameter as the lower section of the adaptor.

18. An adaptor for a food processor appliance having a feed tube, said adaptor comprising: a funnel configured to be receivable within the inlet end of the food processor food tube; and a liquid-receiver receptacle configured to occupy only a portion of said funnel such as to permit both liquid and solid food ingredients to be separately or concurrently fed via said feed tube into said food processor appliance.

19. The adaptor according to claim 18, wherein said liquid-receiver receptacle includes a manually-controllable valve for selectively feeding the liquid therein to said feed tube.

20. The adaptor according to claim 19, wherein said manually-controllable device is a valve which includes a push button carried at one end of a stem, and a valve member carried at the opposite end of the stem and movable thereby to a closed or open position with respect to a valve opening formed in the bottom of said liquid-receiver receptacle.

21. The adaptor according to claim 20, wherein said liquid-receiver receptacle is removably received within said funnel and includes a conical section at one side complementary to the portion of the funnel occupied by said liquid-receiver receptacle, and a handle section at the opposite side for applying and removing said liquid-receiver receptacle with respect to said funnel.

22. The adaptor according to claim 21, wherein said handle section is integrally formed in a wall extending across said opposite side of the liquid-receiver receptacle and carries the push-button of said manually-controllable valve.

23. The adaptor according to claim 19, wherein said manually-controllable device includes a gate manually movable to an open or a closed position to selectively control the flow of the contents of the funnel to the food processor device within the housing.

24. The adaptor according to claim 23, wherein said gate is pivotally mounted to a closed position between said funnel and said feed tube, or to an open position away from said funnel and said feed tube.

25. The adaptor according to claim 18, wherein said funnel includes a partition member presettable to selectively divide the funnel into a liquid-receiver portion and a solid-receiver portion.

26. The adaptor according to claim 25, wherein said partition member is pivotally mounted at its upper end to selectively move its lower end with respect to one or more outlet openings at the lower end of the funnel.

27. A base for supporting a food processor appliance comprising a housing including a juice extractor, an outlet for outletting extracted juice, and a juice-receiver receptacle for receiving said extracted juice;

characterized in that said base includes a tray to underlie said juice outlet for supporting said juice-receiver receptacle and for receiving any drippings from said juice outlet when said juice-receiver receptacle is not supported thereon.

28. The appliance according to claim 27, wherein said tray is movable from a non-operative, retracted position within said base, to an operative, extended position projecting from said base under said juice outlet.

29. A food processor appliance, comprising:

a housing including a food processing device therein;

and a feed tube having an inlet end for inputting into said housing food articles to be processed by said food processing device;

characterized in that said feed tube includes a plurality of radially-displaceable fingers engageable with food articles fed therethrough, for restricting lateral movement of such food articles within said feed tube during the operation of the food processing device.

30. The appliance according to claim 29, wherein said plurality of radially-displaceable fingers are leaf springs attached to the inner surface of said feed tube.

31. A food processor appliance, comprising:

a housing including a food processing device therein;

and a feed tube having an inlet end for inputting into said housing food articles to be processed by said food processing device;

characterized in that said appliance further comprises an adaptor receivable in said feed tube and having a passageway of smaller cross-section than that of said feed tube for adapting the appliance to receive long, slim food articles, such as carrots, cucumbers and the like, in a manner restricting lateral movement thereof within said feed tube during the operation of said food processing device.

32. The appliance according to claim 31, wherein said adaptor includes:

a lower section having an outer diameter substantially the same as the inner diameter of the feed tube for reception therein;

an upper section of larger outer diameter than the inner diameter of the feed tube for seating on the inlet end of the feed tube;

and a passageway of smaller diameter than the inner diameter of the feed tube for receiving long, slim food articles in a manner restricting lateral movements thereof within said feed tube during the operation of said food processing device.

33. The appliance according to claim 32, wherein said upper section of the adaptor includes an outer tubular extension of the same outer diameter as the lower section of the adaptor.

* * * * *